United States Patent
Shimizu

(10) Patent No.: US 6,615,119 B1
(45) Date of Patent: Sep. 2, 2003

(54) OBJECT-ORIENTED DIAGNOSTIC APPARATUS FOR VEHICLE CONTROLLER

(75) Inventor: Kokichi Shimizu, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/383,277

(22) Filed: Aug. 26, 1999

(30) Foreign Application Priority Data

Sep. 18, 1998 (JP) .......................................... 10-264830

(51) Int. Cl.$^7$ ................................................ G06F 11/00

(52) U.S. Cl. ........................ 701/29; 73/117.2; 714/46; 340/439

(58) Field of Search ............................. 701/29, 31, 33; 73/117.2; 714/46; 340/438, 439

(56) References Cited

U.S. PATENT DOCUMENTS 4,497,057 A * 1/1985 Kato et al. ..................... 371/29
5,671,141 A   9/1997 Smith et al. ................... 701/29

FOREIGN PATENT DOCUMENTS

WO    WO 97/13064    * 4/1997

* cited by examiner

Primary Examiner—Thomas G. Black
Assistant Examiner—Arthur D. Donnelly
(74) Attorney, Agent, or Firm—Nixon & Vanderhye PC

(57) ABSTRACT

A vehicle controller self-diagnosis apparatus having areas such as memory information, tables, and the like relating to abnormality-detection processing that can be easily modified when abnormal-detection targets are increased or decreased, thereby reducing the amount of time required to implement such changes. An abnormality-diagnosis program of the present invention includes an abnormality-detection object, an abnormality-verification object, and an abnormality-processing object. The abnormality-detection object is provided with a program of object-oriented design to determine normality or abnormality based on information from several sensors. The abnormality-verification object is provided with a program of object-oriented design to process a flag set by the abnormality-detection object. The abnormality-processing object is provided with a program of object-oriented design to comprehensively determine an abnormality-detection result for a plurality of abnormality-detection targets, and to ultimately decide whether an abnormality-indicating lamp should be illuminated.

22 Claims, 17 Drawing Sheets

FIG. 16

N = NORMAL
A = ABNORMAL

L = LUMP ILLUMINATED
N = NOT ILLUMINATED

|  | 65ms-1 | 65ms-2 | 65ms-3 | 65ms-4 | 65ms-5 | 65ms-6 | 65ms-7 | 65ms-8 |
|---|---|---|---|---|---|---|---|---|
| WATER TEMP. SENSOR | N | A | N | A | A(b) | A | N | N(i) |
| INTAKE TEMP. SENSOR | N | N | A | A(a) | N(d) | A | N | N(j) |
| THROTTLE SENSOR | N | N | N | N | A(e) | A | A(h) | N(k) |
| NUMBER OF DIAGNOSIS ABNORMALITIES | 0 | 1 | 2 | 2 | 3(f) | 3 | 3 | 1(ℓ) |
| NUMBER OF DIAGNOSIS RECOVERIES | 0 | 0 | 1 | 0 | 1(g) | 0 | 2 | 1(m) |
| LAMP ILLUMINATED/ NOT ILLUMINATED | N | L | L | L | L | L | L | N |

FIG. 19
PRIOR ART

TABLE FOR ABNORMALITY CODE DETECTION

| ADDRESS OF BIT | BIT POSITION | CODE OUTPUT TO TOOL |
|---|---|---|
| &eflag1 | 0 | 0×11 | ← WATER TEMP. SENSOR
| &eflag1 | 1 | 0×22 |
| &eflag1 | 2 | 0×33 |
| &eflag1 | 3 | 0×44 |
|  |  |  |

OBJECT-ORIENTED DIAGNOSTIC APPARATUS FOR VEHICLE CONTROLLER

CROSS-REFERENCE TO RELATED APPLICATION

The present application is related to, and claims priority from, Japanese Patent Application No. Hei. 10-264830, the contents of which are incorporated herein by reference.

BACKGROUND OF THE INVENTION

1. Technical Field

The present invention relates to a vehicle controller, and more specifically, to a vehicle controller diagnostic apparatus for detecting abnormalities in vehicle sensors, actuators, or the like via an object-oriented based methodology.

2. Related Art

A conventional vehicle controller is disclosed, for example, in Japanese Patent Application Laid-open No. Hei 7-91310, and includes a self-diagnosis apparatus for detecting abnormalities in the engine-control system. When an abnormality is detected, an indicator lamp is illuminated to prompt the driver with a warning, or an abnormality code indicating the abnormal location is output to an external diagnosis apparatus to allow an operator at a dealer or service shop to specify the location of the abnormality.

FIG. 18 illustrates a memory area for an abnormality flag, a flag for lamp-illuminating use, and an abnormality-code flag according to a conventional self-diagnosis apparatus such as the one discussed above. Additionally, FIG. 19 illustrates a table for abnormality-code determining use. As shown in FIG. 18, to illuminate an indicator lamp and output an abnormality code, flag information for each use and application thereof is stored within a memory within the electronic controller.

In FIG. 18, (A) indicates a memory area for storing a present abnormality flag, and bit positions within this memory area are programmed in correspondence with each abnormality-detection target. Namely, the first bit is the bit position for water-temperature sensor use, the second bit is the bit position for intake-air temperature sensor use, the third bit is the bit position for throttle-sensor use, and the fourth bit is the bit position for ECT-solenoid use. Accordingly, when an abnormality is detected by an abnormality-detection routine (not illustrated), the bit information corresponding to the abnormality-detection target changes from "0" to "1."

Additionally, (B) indicates a memory area for storing a flag for indicator-lamp illuminating use, and the information relating to the flag for indicator-lamp illuminating use is constantly updated with the bit information at the present abnormality flag (A) at every iteration of a predetermined time interval. When even a single datum indicating an abnormality exists in the bit information within the flag area for indicator-lamp illuminating use, the indicator lamp is illuminated.

Furthermore, (C) indicates a memory area for storing the abnormality-code flag, and is constantly updated with the abnormality-code flag information and the bit information at the present abnormality flag (A) at every iteration of a predetermined time interval. This information is then capable of being read out to an external portion by an operator at a dealer or service shop performing a desired operation.

Further, because specification of which component is abnormal is not possible even when the information of the abnormality-code flag is output without modification, generally, as shown in FIG. 19, a table relating the bit positions of the abnormality-code flag and output codes is provided within the electronic controller, and a code converted according to this table is read out to an external portion. For example, when an abnormality has occurred in the water-temperature sensor, a code of "11" is output.

In this way, with a failure-diagnosis apparatus according to the prior art, 1) the correspondence relationship (the first bit being the water-temperature sensor, and so on) of the bit-position information of the respective flag areas of the present abnormality flag, the flag for indicator-lamp illuminating use, and so on is equivalent. As a result, the respective abnormality-detection information bit-by-bit can be copied (processed) bit by bit.

2) A memory area is disposed in each respective use object, such as the object for storing a presently-occurring abnormality, the object for performing lamp indication, and the like, and all abnormality-detection target information is caused to be concentrated in the several memory areas. Therefore, the number of accesses wherein batch processing can be performed is reduced, and memory capacity can be reduced. For example, when an abnormality detection result with the ignition key in an "off" state is caused to be invalid to prevent erroneous detection of an abnormality, achievement is possible by setting the respective bit information of the present abnormality flag to "0" as a block.

However, with the above-described apparatus, modification of everything from the definitions of the bits of the respective memory areas to the various types of tables as shown in FIG. 19 is necessary when an abnormality-detection program is applied in a different engine-control system, or when the number of abnormality-detection targets are increased due to application-specific changes.

For example, when settings of an automobile with a manual transmission (M/T) are expanded in an automobile with an automatic transmission (A/T), tasks to delete the bits and settings relating to the A/T-control solenoid, to add M/T-dedicate diagnoses, and so on are necessary. For this reason, program-development man-hours are increased. Moreover, unless all such modifications are completed, verification of program operation (debugging) becomes difficult.

SUMMARY OF THE INVENTION

In view of the above-discussed limitations, it is an object of the present invention to provide a vehicle controller self-diagnosis apparatus in which modification of areas such as memory information, tables, and the like relating to abnormality-detection processing can be easily made even when abnormal-detection targets are increased or decreased, thereby minimizing the time and effort required to implement such programming changes.

Specifically, the present invention provides a vehicle controller diagnostic apparatus with a plurality of abnormality-detection objects each associated with a discrete detection target. Each of the abnormality-detection objects includes an abnormality-detection program and a first data-storing portion for storing data on the corresponding detection target during detection of a detection target abnormality. Also, an abnormality processing object is provided for performing abnormality-occurrence processing with respect to the corresponding detection targets based on data in the first data-storing portion of each of the abnormality-detection objects.

The abnormality processing object performs the above-described processing independently of the number of abnormality-detection objects that are implemented, thereby enabling abnormality-detection objects to be added or deleted as application parameters change.

BRIEF DESCRIPTION OF THE DRAWINGS

FIG. 16 is a drawing indicating DIAGERR, DIAGOK, and the actual illumination/nonillumination state of a lamp when three sensors applied to the same lamp have repeated normality and abnormality conditions;

FIG. 19 is an explanatory diagram for a table for abnormality-code determining use according to the prior art.

DETAILED DESCRIPTION OF THE PRESENT INVENTION

Figure 1:
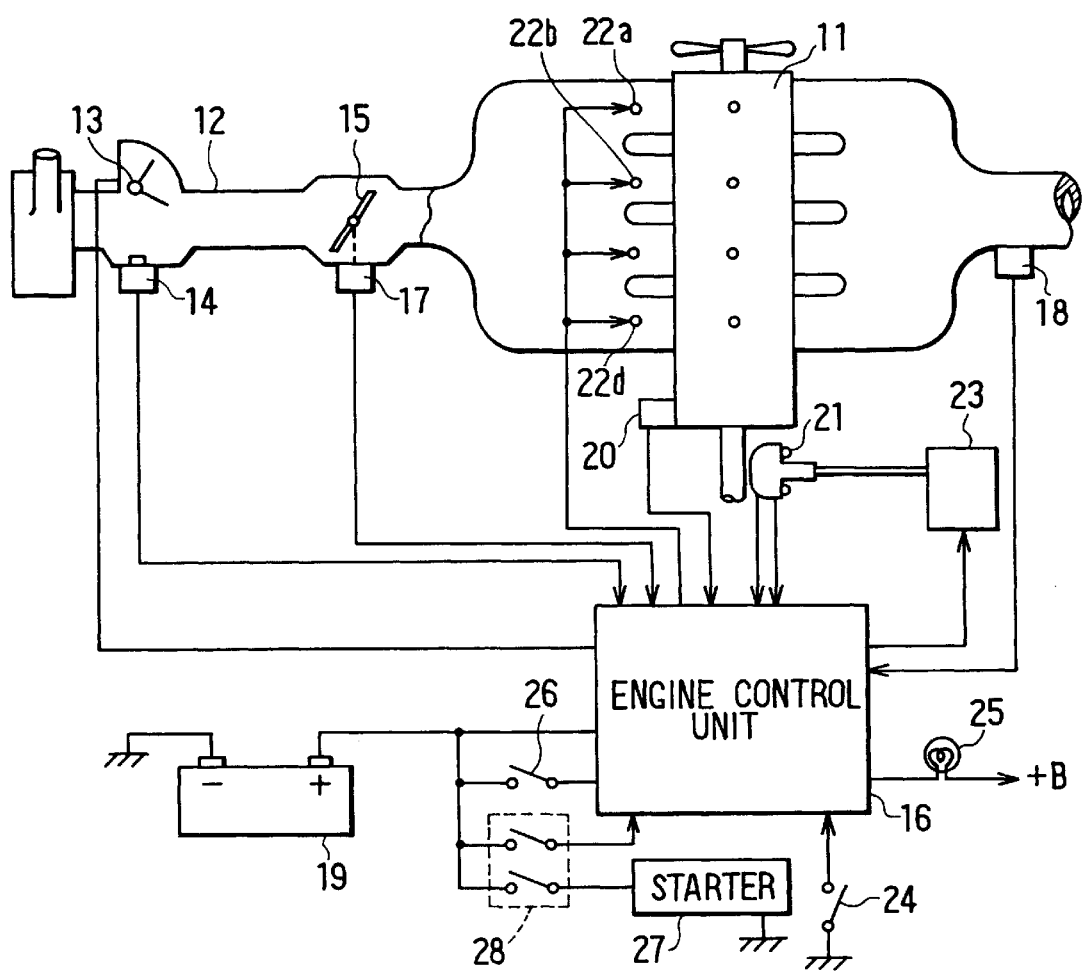
FIG. 1 is an example structural view of an engine-control system for performing abnormality diagnosis.

An embodiment of the present invention will be described hereinafter with reference to the drawings. FIG. 1 is an example structural view of an engine-control system for performing abnormality diagnosis. Intake air from an air cleaner is supplied via an intake-air tube 12 to an engine 11. In this intake-air tube 12 are disposed an airflow sensor 13 to measure the amount of intake air, and an intake-air temperature sensor 14 to detect intake-air temperature.

In addition, a throttle valve 15 actuated by an accelerator pedal is also disposed in the tube 12. The engine 11 is controlled by an engine-control unit made up of a microprocessor and the like, and an intake-air quantity detection signal from the airflow sensor 13 and a detection signal from a throttle sensor 17 detecting the opening state of the throttle valve 15 are supplied to the engine-control unit 16.

A detection signal from an air-fuel ratio sensor 18 for detecting the oxygen concentration of exhaust gas, a battery-voltage signal from a battery 19, a detection signal from a water-temperature sensor 20, a crank signal from a distributor 21 driven by the engine 11, and other various detection signals corresponding to operating states of the engine 11 are supplied to the engine-control unit 16.

The engine-control unit 16 calculates fuel-injection quantity and the like corresponding to the engine operating state based on the various detection signals. Also, fuel-injection instructions are output with respect to injectors 22a–22d established respectively in a plurality of cylinders of the engine 11, ignition-instruction signals are output with respect to an igniter 23, and engine operating control is executed.

Furthermore, with the engine-control unit 16, abnormality-diagnosis operation of the various controllers mounted on the vehicle also is executed based on detection signals from the several sensors. For this reason, a test switch 24 associated with the engine-control unit 16 establishes a diagnostic mode for output of the abnormality-detection detection result. An indicator lamp 25 for displaying the result of a resultant test diagnosis is also connected to the control unit. Moreover, a switch 26 connects the battery 19 to the engine-control unit 16, and a starter switch 28 controls a starter motor 27 so as to be interlocked with the ignition switch 26.

Figure 2:
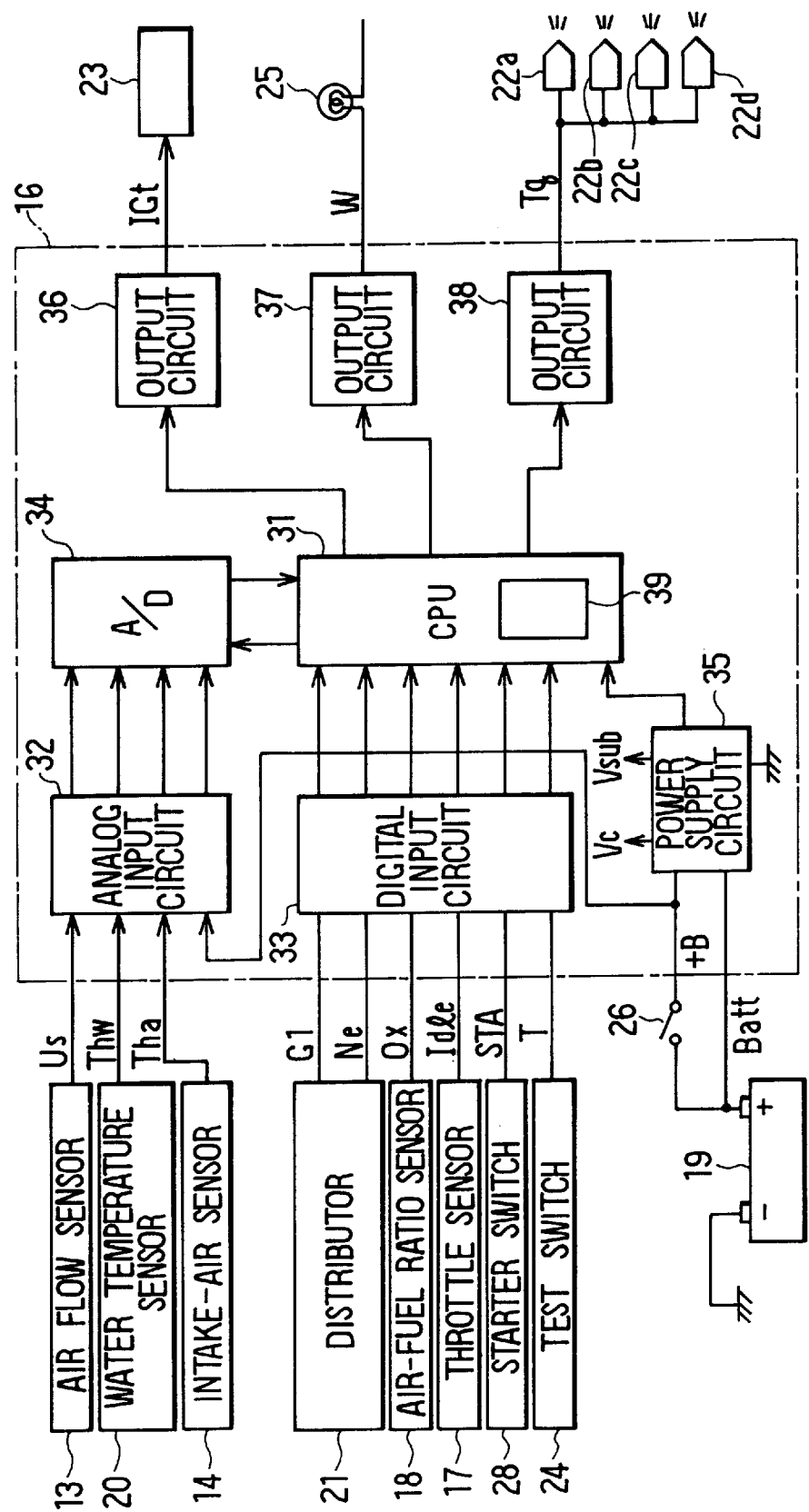
FIG. 2 is a block diagram for describing the basic structure of the engine-control unit of FIG. 1.

FIG. 2 is a block diagram illustrating the basic structure of the engine-control unit of FIG. 1. The engine-control unit 16 is provided with a CPU 31 including a microprocessor. Data from an analog input circuit 32 and a digital input circuit 33 are input to the CPU 31, and analog input data from the analog input circuit 32 is converted to digital data by an A/D converter 34 and input to the CPU 31.

A detection signal Us from the airflow sensor 13, a detection signal Thw from the water-temperature sensor 20, a detection signal Tha from the intake-air sensor 14, voltage B of the battery 19, and so on are input to the analog input circuit 32. A cylinder-discrimination signal G1 and a speed signal Ne from the distributor 21, a lean/rich signal Ox corresponding to oxygen concentration from the air-fuel fuel ratio sensor 18, an idle signal Idle indicating that the throttle valve 15 is fully open from the throttle sensor 17, a start signal STA from the starter switch 28, a signal T establishing the diagnostic mode from the test switch 24, and so on are input to the digital input circuit 33.

The A/D converter 34 includes a multiplexer function to sequentially select and acquire the various detection signals input to the analog input circuit 32 in correspondence with the instructions from the CPU 31, and to convert the signals to digital data. Furthermore, a power-supply circuit 35 supplies the CPU 31 with the voltage +B of the battery 19 via the ignition switch 26, and also constantly supplies a power supply for backup use Batt.

Output data from the CPU 31 is supplied to output circuits 36, 37, and 38, and is output as output signals from the engine-control unit 16. That is to say, an ignition-instruction signal IGt is output with respect to the igniter 23 from the output circuit 36. A signal W indicating the diagnostics result is output from the output circuit 37 to control illumination of the indicator lamp 25. Further, an output signal $\tau_q$ from the output circuit 38 instructs a fuel-injection quantity corresponding to the operating state of the engine 11, and is supplied to the igniters 22a–22d to control the igniters and thus the fuel amount respectively injected into the several cylinders. Moreover, a memory (ROM) 39 for storing an abnormality-diagnosis program which will be described later is disposed within the CPU (engine-control unit) 31.

Figure 3:
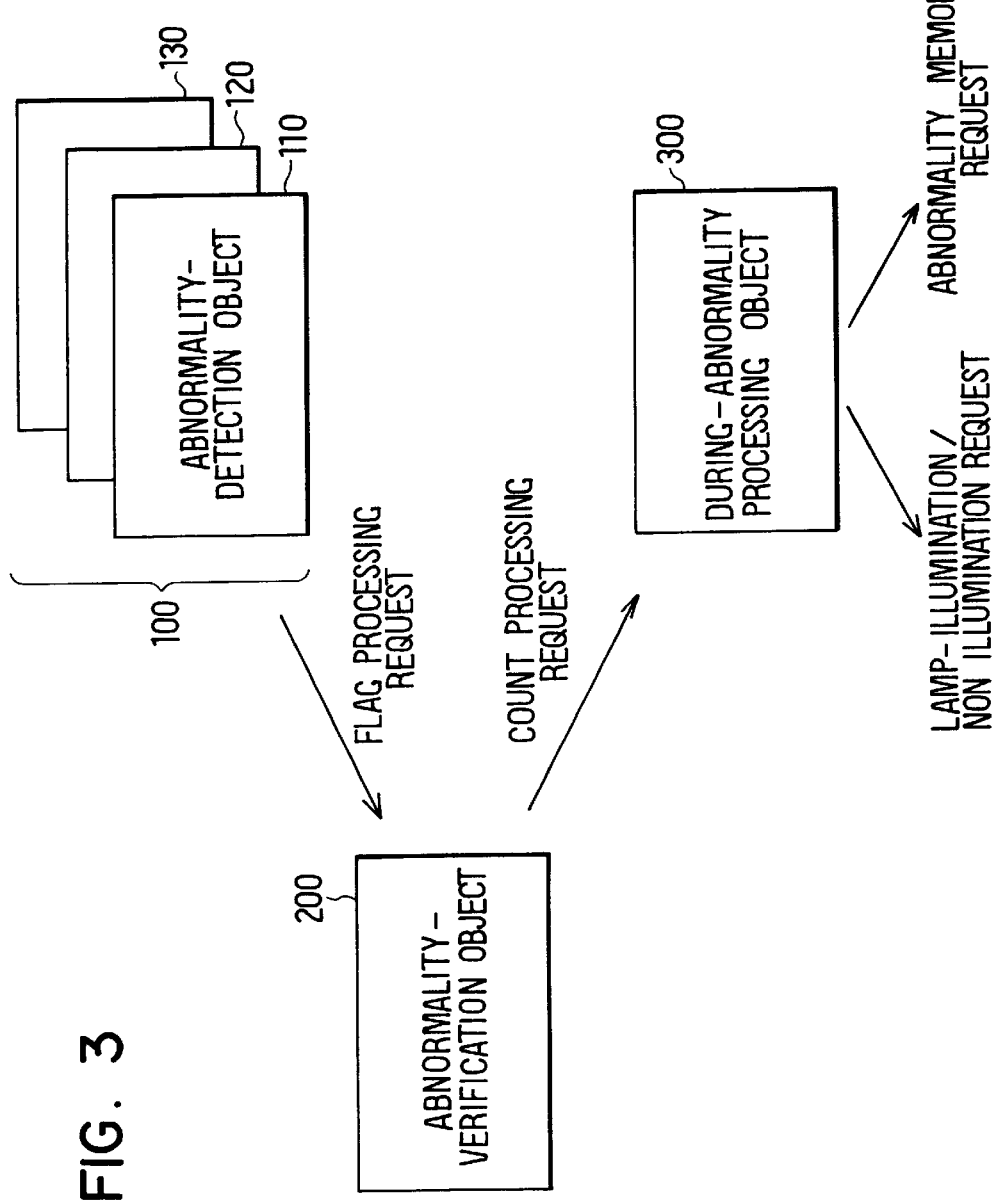
FIG. 3 is an explanatory drawing conceptually indicating the structure (architecture) of the abnormality-diagnosis program according to the present invention.

FIG. 3 is an explanatory drawing conceptually indicating the structure (architecture) of the abnormality-diagnosis program stored in the memory 39 within the engine-control unit according to the present invention. The abnormality-diagnosis program according to the present invention is of object-oriented design. As is already known, whereas conventional software focuses on the processing (for example, the processing of fuel injection) taken to be the object thereof, object-oriented design performs modeling with the object thereof as the basic unit, and defines processing based on the characteristics and behavior (operation) of that object. This basic unit is termed an "object," and with a program of object-oriented design, is described as the minimum structural unit.

In the overall program, processing is executed through linking objects by communication (termed "messages") in the form of requests and responses. An object is described as data ("attributes") and a procedure for processing the data ("method") in an integrated form, and a method is executed by transmitting a request from one object to another. Additionally, a work request to an object can be performed solely via a method, and direct access to data within an object is prohibited.

An actual abnormality-diagnosis program is provided with various programs, such as one to perform communication with a diagnostic tool externally connected to the engine-control unit 16, but herein only essential portions for describing the present embodiment will be indicated.

As shown in FIG. 3, the abnormality-diagnosis program of the present invention includes an abnormality-detection object 100, an abnormality-verification object 200, and an abnormality processing object 300. The abnormality-detection object 100 is provided with a program to determine normality or abnormality based on information from several sensors that is input to the engine-control unit 16, and this abnormality-detection object 100 is initiated for each abnormality-detection target.

Namely, the example in FIG. 3 depicts a water temperature sensor abnormality-detection object 110 (hereinafter termed the water-temperature sensor object) for detecting the abnormality of the water-temperature sensor 20, an intake-air temperature sensor abnormality-detection object 120 (hereinafter termed the intake-air temperature sensor object) for detecting the abnormality of the intake-air temperature sensor 14, and a throttle-sensor abnormality-detection object 130 (hereinafter termed the throttle-sensor object) for detecting the abnormality of the throttle sensor 17. Furthermore, when the number of abnormality-detection targets increases, abnormality-detection objects may be added in correspondence thereto. Conversely, when the number of abnormality-detection targets decreases, abnormality-detection objects may be correspondingly deleted.

When an abnormality is detected, as will be described later, a flag-processing request message is issued by the abnormality-verification object 200, and a count-processing request message from the abnormality-verification object 200 is issued by the abnormality processing object 300.

That is to say, the abnormality-verification object 200 is provided with a program to process the flag set by the abnormality-detection object 100, and is started by a subroutine call from the abnormality-detection object 100.

It should be appreciated that the program existing in the abnormality-verification object 200 can be incorporated in each object of the abnormality-detection object 100 and executed individually. However, the program of the abnormality-verification object 200 is independent because of common processing among the several objects. As a result, with the present invention ROM capacity can be reduced, and when an abnormality-detection object for a new abnormality-detection detection target is created, the program of this common portion need not be altered, thereby simplifying overall implementation.

In addition, the abnormality processing object 300 is provided with a program to comprehensively determine the abnormality-detection results for a plurality of abnormality-detection targets, and ultimately to decide whether to illuminate a lamp indicative of the existence of an abnormality at a particular target.

As has been described previously, abnormality-detection objects 100 may be added or deleted according to the increase or decrease in abnormality-detection targets, with no need to modify the programs in the abnormality-verification object 200 or the abnormality processing object 300.

Figure 4:
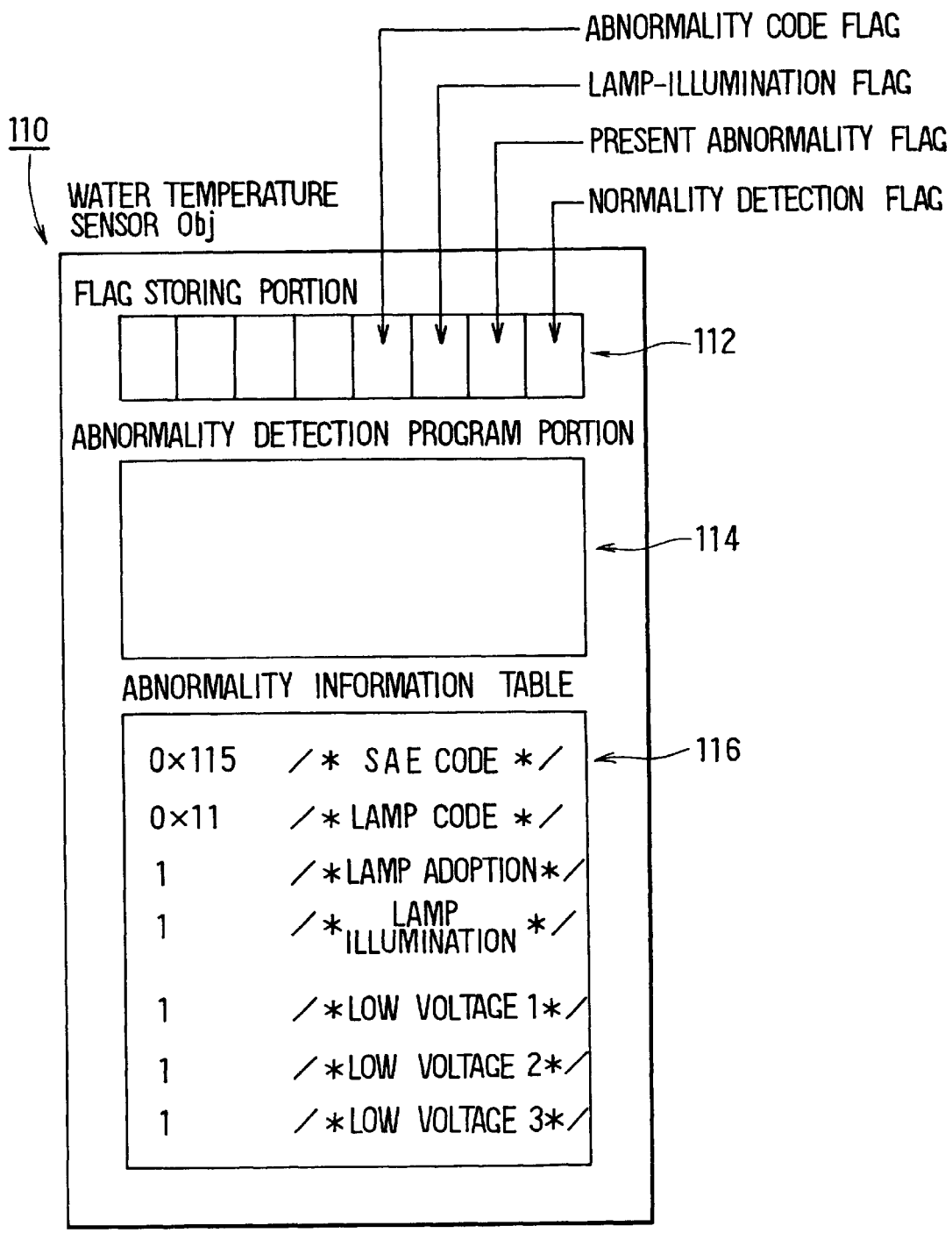
FIG. 4 is an explanatory diagram depicting the details of the water-temperature sensor object indicated in FIG. 3.

FIG. 4 is an explanatory diagram depicting the details of the water-temperature sensor object indicated in FIG. 3. Additionally, the intake-air temperature sensor object 120, the throttle-sensor object 130, and so on have similar architectures. As shown in the diagram, the water-temperature sensor object 110 includes a flag-storing portion 112, an abnormality-detection program portion 114, and an abnormality-information table 116.

Information indicating abnormality or normality, as well as information indicating whether a lamp should be illuminated to warn the driver upon occurrence of an abnormality, is stored as flag (1-bit) information in the flag-storing portion 112, as will be described in specific terms hereinafter.

For a normality-determination flag, flag "1" is set at a time of normality determination by the abnormality-detection program portion 114.

For a present abnormality flag, flag "1" is set at a time of abnormality determination by the abnormality-detection program portion 114.

A lamp-illumination flag instructs lamp illumination when an abnormality is verified and flag "1" is set.

An abnormality-code flag stores the fact of existence of an abnormality when an abnormality is verified and flag "1" is set.

Additionally, an abnormality-detection program indicated in FIG. 6 and described later is stored in the abnormality-detection program portion 114, and the flags of the flag-storing portion 112 are manipulated in accordance with a determination result therein.

Furthermore, characteristic information relating to the several abnormality-detection targets, such as code information (SAE code) output to a diagnostic tool, information (lamp illumination) indicating whether to illuminate a during-abnormality lamp, information (lamp application) indicating which lamp among a plurality of lamps is to be illuminated, information (low voltage 1–3) indicating an abnormality-determination condition, and the like is stored in the abnormality-information table 116. In the case of the water-temperature sensor object in FIG. 4, output of "115" to a diagnostic tool and of "11" to a lamp is indicated. That is to say, according to the present embodiment, unlike an apparatus according to the prior art, flag information and an abnormality-information table are provided for each respective abnormality-detection target.

Figure 5:
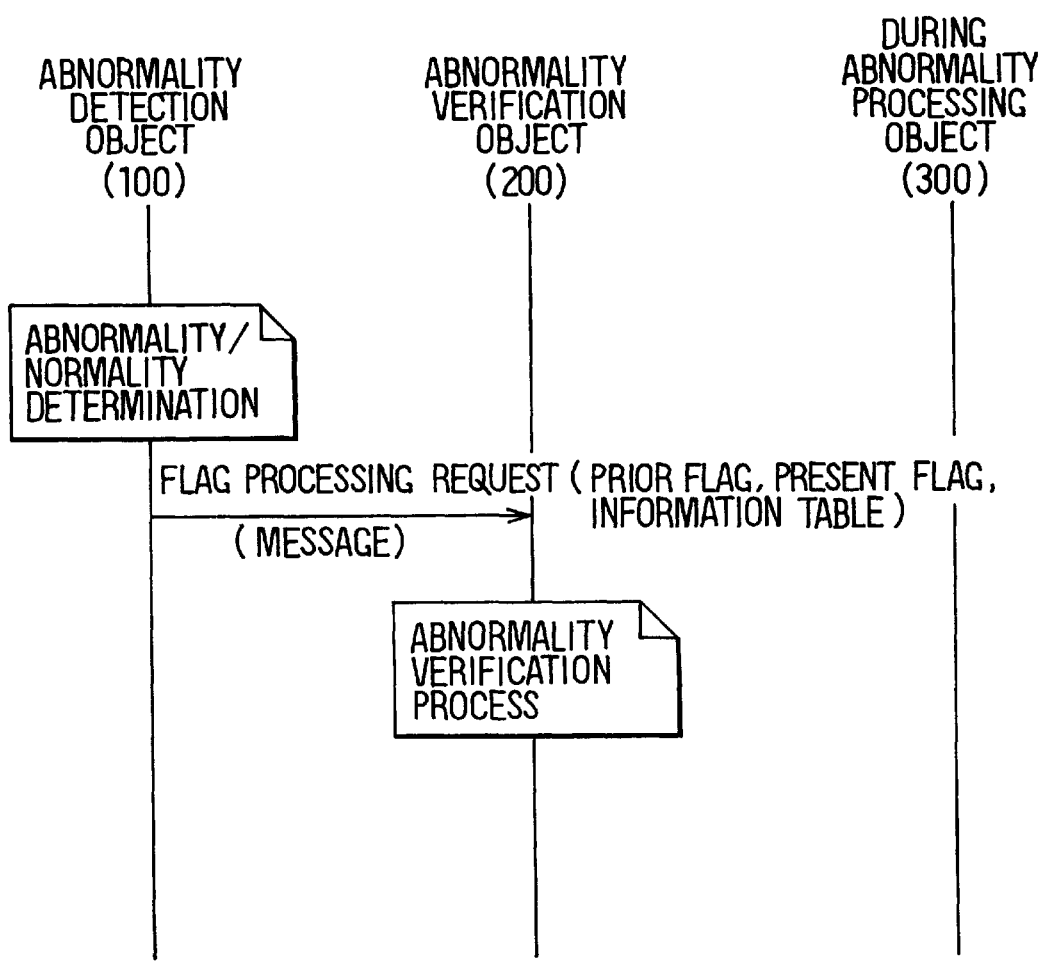
FIG. 5 is a message sequence chart (MSC) indicating the flow of processing executed by the abnormality-diagnosis program of the present invention.

FIG. 5 is a message sequence chart (MSC) indicating the flow of processing executed by the abnormality-diagnosis program. As shown, processing actually executed by the several objects is depicted, and function calls (messages) to other objects are indicated by arrows. That is to say, according to the result of the abnormality determination by the abnormality-detection program portion 114 indicated in FIG. 4, a flag-processing request message is issued to the abnormality-verification object, abnormality-verification processing is performed by the abnormality-verification object, lamp-illumination/nonillumination determination is performed by the abnormality processing object, and a lamp-illumination/nonillumination request is issued.

Figure 6:
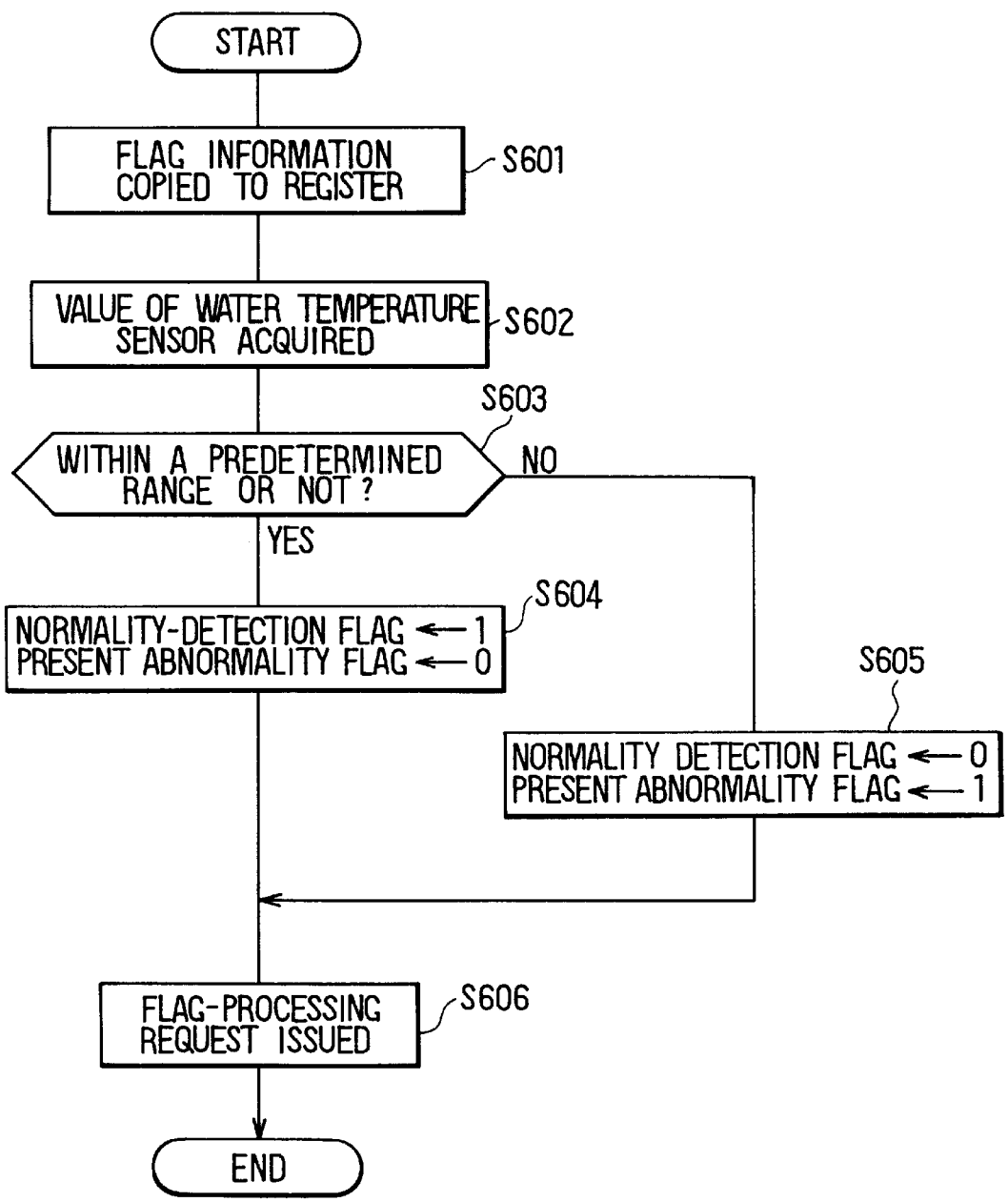
FIG. 6 is a processing flow diagram of the water-temperature sensor object of the present invention.

FIG. 6 is a processing flow diagram of the water-temperature sensor object 110. This program is executed every 16 ms. With the water-temperature sensor object, flag information is first copied to the register (S601). Herein, "copying to the register" refers to causing the flag information of the flag-storing portion 112 verified by prior abnormality-detection processing to be saved to the desired register (not illustrated) as past flag information (additionally, this saved data is utilized at step S805 in FIG. 8).

Next, the detection value of the water-temperature temperature sensor is acquired (S602). Subsequently, determination of whether the acquired value is within a predetermined range is performed (S603). Accordingly, when the value is within the predetermined range (YES), the normality-determination flag is set to "1" and the present abnormality flag is set to "0" (S604). Meanwhile, when the acquired value is not within the predetermined range (NO), the normality-determination flag is set to "0" and the present abnormality flag is set to "1" (S605). Accordingly, a flag-processing request is issued to the abnormality-verification object (S606).

Figure 7:
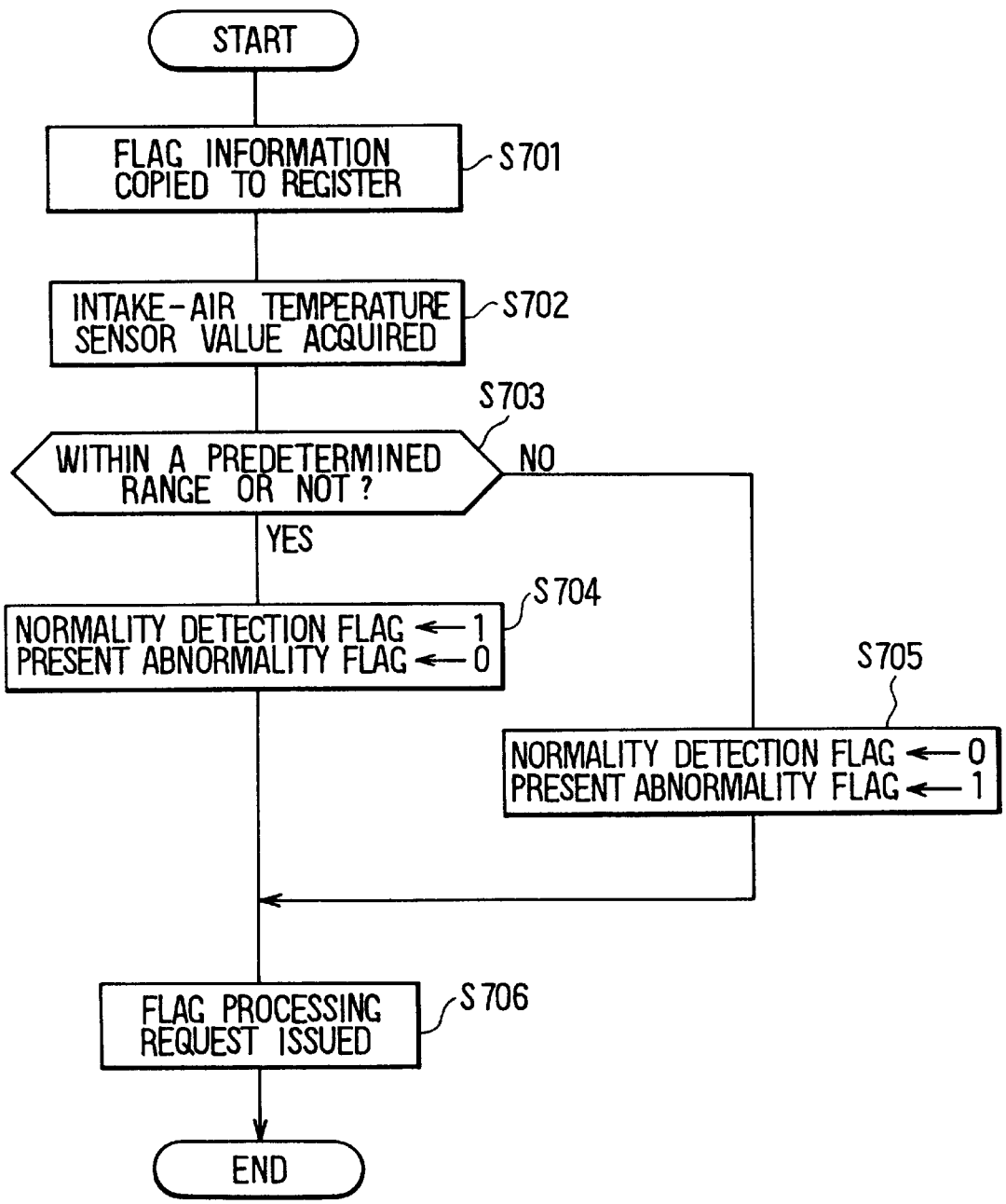
FIG. 7 is a processing flow diagram of the intake-air temperature sensor object of the present invention.

FIG. 7 is a processing flow diagram of the intake-air temperature sensor object 120. In the flow diagram in FIG. 7, acquisition of the water-temperature sensor value in FIG. 6 is merely changed to acquisition of the intake-air temperature sensor, and so description thereof will be omitted.

Figure 8:
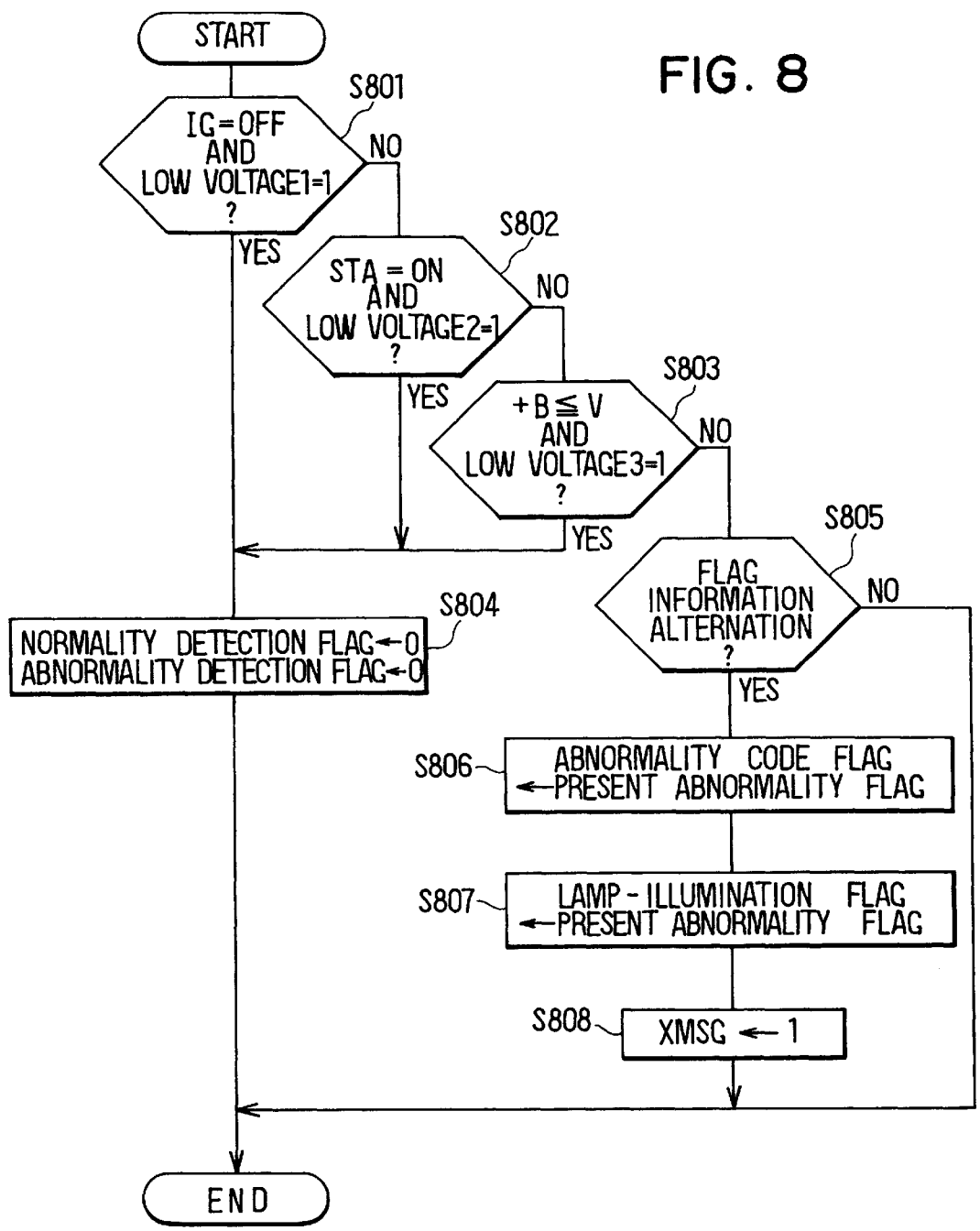
FIG. 8 is a processing flow diagram of the abnormality-verification object of the present invention.

FIG. 8 is a processing flow diagram of the abnormality-verification object 200 in FIG. 3. In the illustrated steps S801–S803, determination of whether the present running state and the information (low voltage 1–3) of the abnormality-information table 116 sent from the abnormality-detection object 100 is "1", and determination of whether being a condition permitting determination of an abnormality, are performed. Specifically, upon detection of an abnormality of the water-temperature sensor, when battery voltage drops, the value of the water-temperature sensor falls outside the predetermined range, irrespective of whether the water-temperature sensor is normal. Consequently, in a case of the water-temperature sensor, by setting the low voltage 3 of the abnormality-information table 116 to "1" (refer to FIG. 4), an affirmative determination (YES) is made at S803, and an abnormality-determination flag is reset. That is to say, the result of an abnormality determination is canceled.

Meanwhile, because the crank sensor to detect the crank signal of the engine is not related to battery voltage, low voltage 3 is established at "0." Due to this, negative determination (NO) with respect to the crank sensor is made at step S803, and at step S805 and subsequently an abnormality determination is made. Therefore, by performing processing based on the information of low voltage 1–3 of the abnormality-information table 116 in FIG. 4, processing can be performed through common processing steps (S801–S803) without the need to consider differences in abnormality conditions. Further, the information relating to IG (state of the ignition switch), STA (state of the starter switch), and +B (state of battery voltage) is stored in the abnormality processing object 300.

Next, when abnormality-detection conditions have all been fulfilled, at step S805 the flag information of value saved in the register and the present flag-storing portion is compared, and determination of whether the flag has changed is performed. At steps S806 and S807, the value of the present abnormality flag is copied to the abnormality-code flag and the lamp-illumination flag only when the flag has changed. Further, an XMSG flag is a flag for initiating the processing in FIG. 13.

As has been described above, the processing of step S806 and after is performed solely when the flag state has changed, and the processing of FIG. 13 which will be described later also is similar. As a result, program load is reduced.

Figure 9:
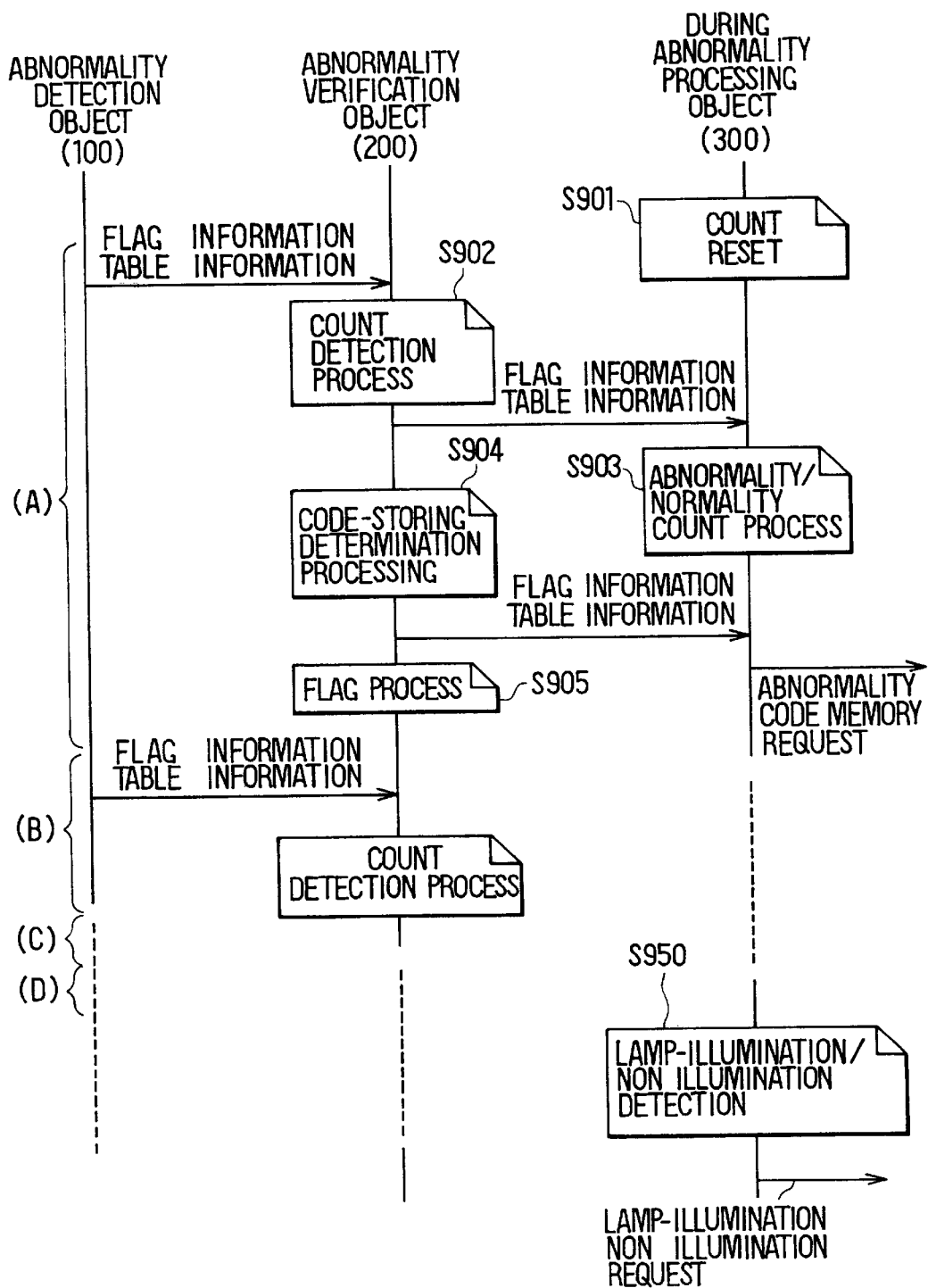
FIG. 9 is a message sequence chart (MSC) relating to lamp-illumination processing of the present invention.

FIG. 9 is a message sequence chart (MSC) relating to lamp-illumination processing. Execution of this sequence is repeated every 65 ms. (A), (B), (C), and (D) are respectively the processing of a single abnormality-detection target; when the processing of (A) ends, processing is transferred to (B).

Details will be described in FIG. 10 and after, but first, at step S901, the counter for determining lamp illumination at step S950 is cleared (reset). At step S903, whether counting is to be performed at step S903 is determined from the state of the lamp-illumination flag. When it is determined that counting is to be performed, a count-processing request is issued to the abnormality processing object 300.

At step S904, the XMSG flag is examined, and determination of whether to store an abnormality code is performed. When it is determined that the code is to be stored, an abnormality-code store request is issued to the abnormality processing object. At step S905, the XMSG flag and the lamp-illumination flag are cleared. The processing of a single abnormality-detection target (abnormality-detection object) ends, and processing identical thereto is repeated for the other abnormality-detection targets ((B)–(D)). Accordingly, when the processing for all abnormality-detection targets ends, at step S950 determination of whether the lamp is to be illuminated is performed, and when it is determined that the lamp is to be illuminated, a lamp-illumination request is sent.

Figure 10:
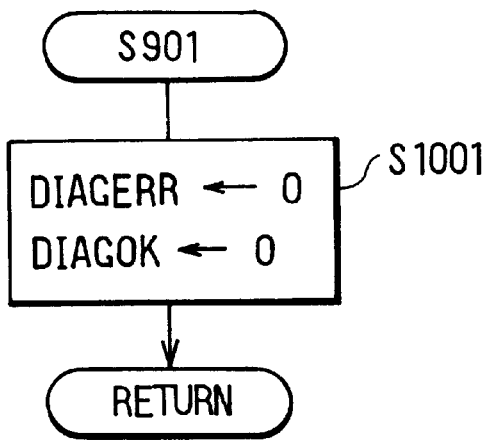
FIG. 10 is a detailed flow diagram of step S901 in FIG. 9.

FIG. 10 is a detailed flow diagram of step S901 in FIG. 9. As shown, a counter (DIAGERR) to count the number of abnormalities and a counter (DIAGOK) to count normal-recovery locations are reset (S1001).

Figure 11:
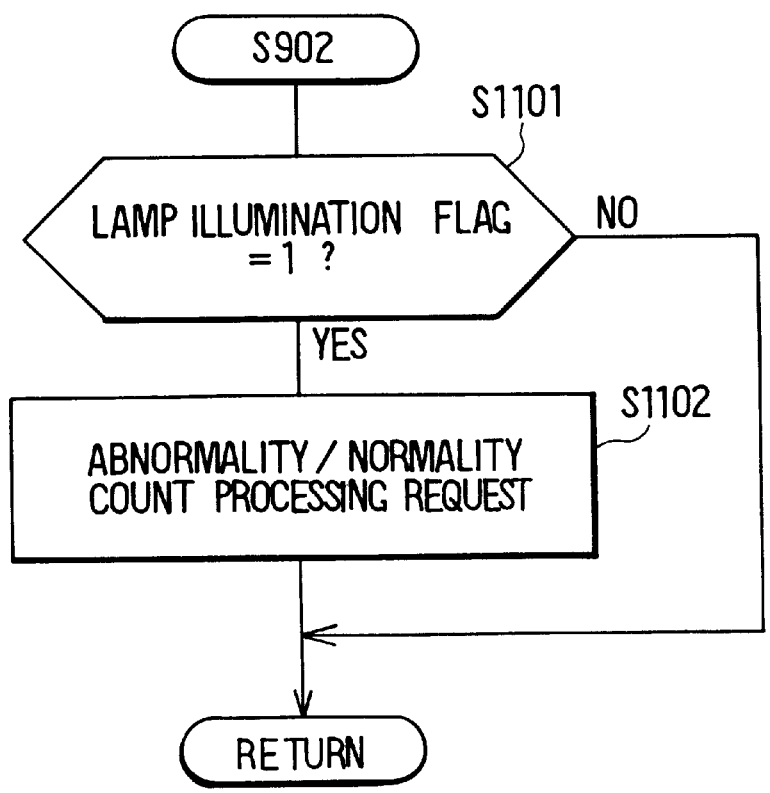
FIG. 11 is a detailed flow diagram of step S902 in FIG. 9.

FIG. 11 is a detailed flow diagram of step S902 in FIG. 9. Determination of whether the lamp-illumination flag (the flag instructing lamp illumination with abnormality occurrence) is "1" is performed (S1101), and execution of abnormality/normality count processing is requested of the abnormality processing object only when the flag is "1" (S1102).

Figure 12:
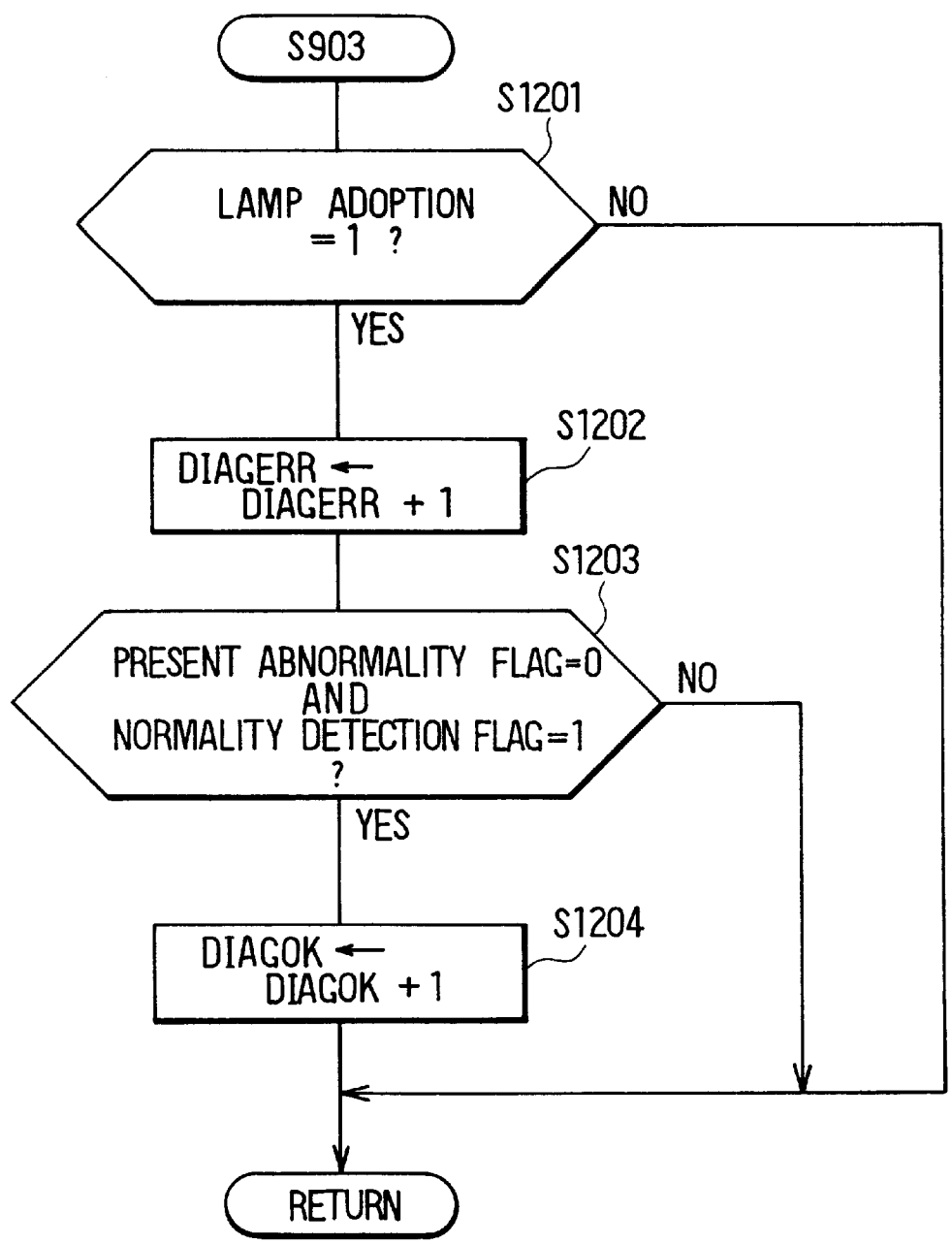
FIG. 12 is a detailed flow diagram of step S903 in FIG. 9.

FIG. 12 is a detailed flow diagram of step S903 in FIG. 9. First, the information (lamp application) to specify which lamp to illuminate is examined, and it is determined whether the appropriate article is performed (S1201). Herein the value is "1," but as a multiplicity of warning lamps typically exists in a vehicle, a case lamp application 2, 3, or the like may occur.

Next, the counter DIAGERR to count the number of abnormalities is incremented (S1202). Subsequently, it is determined whether the present abnormality flag is "0" and moreover if the normality-determination flag is "1." That is, despite an initial abnormality determination, a determination of whether normality has been subsequently recovered is performed (S1203). When normality has in fact been recovered, the counter DIAGOK to count normal-recovery locations is incremented (S1204).

More precisely, the number of times that the lamp-illumination flag is "1" and the normality-determination flag also is "1" is counted, and counting is performed only by the processing shown in FIG. 12, which is initially executed subsequently to normal recovery. This is because subsequent to counting, the lamp-illumination flag becomes "0" in the processing in FIG. 14, a negative determination is made in FIG. 11, and the processing in FIG. 12 is not executed.

Figure 13:
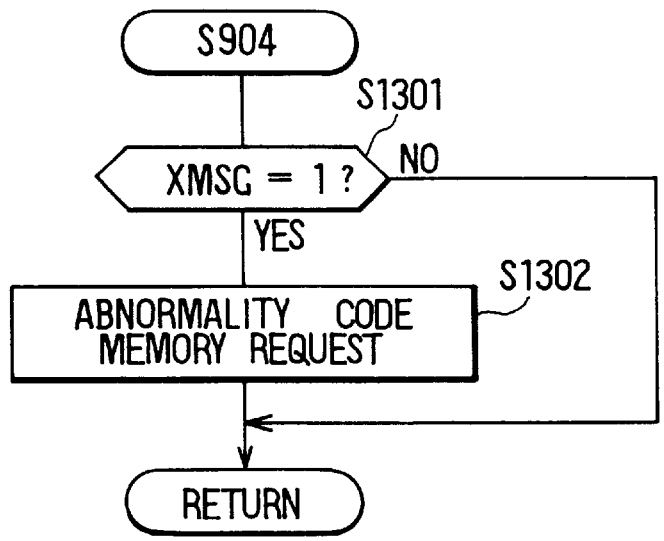
FIG. 13 is a detailed flow diagram of step S904 in FIG. 9.

FIG. 13 is a detailed flow diagram of step S904 in FIG. 9. First, for the message flag XMSG which becomes "1" when the flag state has changed, determination of whether XMSG=1 is performed (S1301). When XMSG=1, a store request for the abnormality code is issued (S1302). In this case, for the store request for the abnormality code, an abnormality-code store request is not sent every time an abnormality occurs, but rather the processing of the abnormality-detection object is performed only when the flag state has changed. Therefore, the processing load of the abnormality-detection object is not increased.

Figure 14:
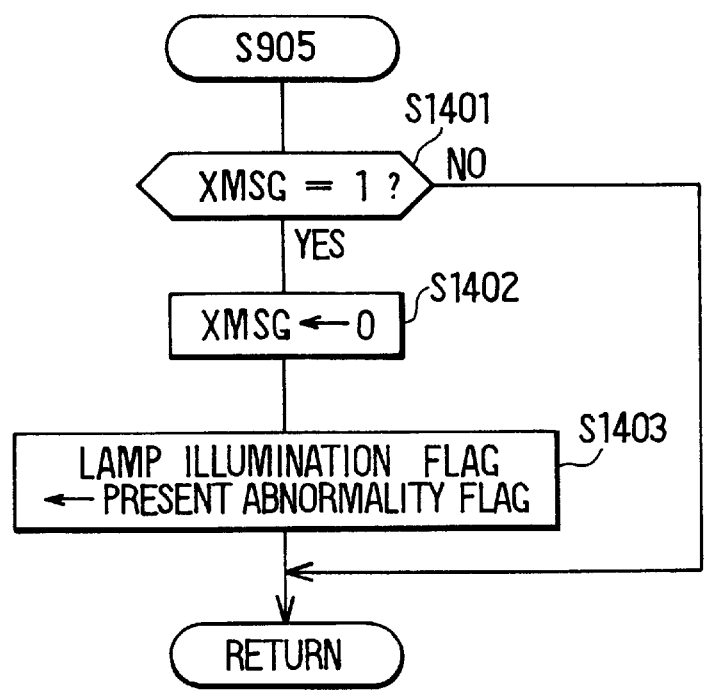
FIG. 14 is a detailed flow diagram of step S905 in FIG. 9.

FIG. 14 is a detailed flow diagram of step S905 in FIG. 9. In FIG. 14, the XMSG flag which becomes "1" when the flag state has changed is examined. When the XMSG flag is "1" (S1401), it is reset (S1402), and the lamp-illumination flag is set to the valve of the present abnormality flag (S1403). That is to say, to determine whether normality has been recovered from abnormality in FIG. 12, even when normal recovery has occurred, the lamp-illumination flag is not immediately reset, but it is when the count processing of the counter DIAGOK has ended.

As a result, the lamp-illumination determination of step S950 in FIG. 9 is performed when the processing of FIGS. 10–14 has been executed with respect to a single abnormality-detection target, processing is executed for the other abnormality-detection targets, and the counters DIAGERR and DIAGOK are counted with respect to all abnormality-detection targets.

Figure 15:
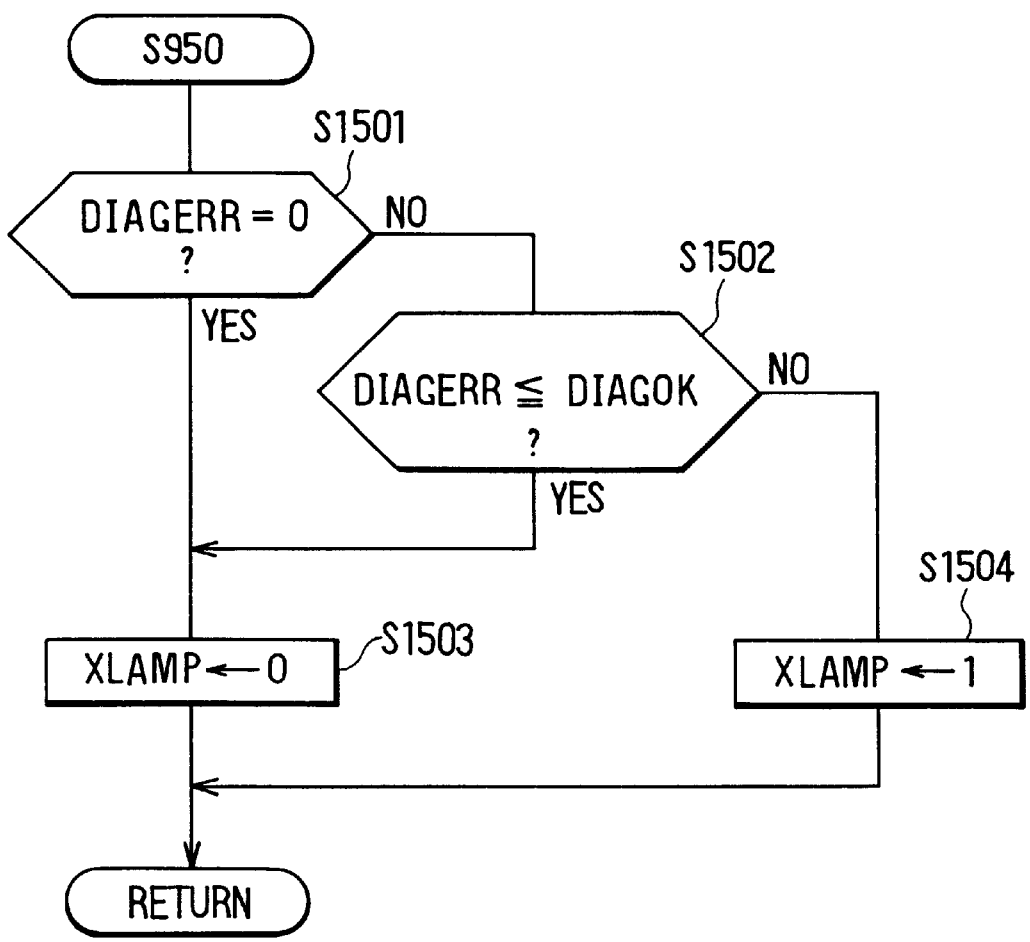
FIG. 15 is a detailed flow diagram of step S950 in FIG. 9.

FIG. 15 is a detailed flow diagram of step S950 in FIG. 9. When the counter DIAGERR=0 (YES in S1501) or when the count value of the counter DIAGOK is not less than the count value of DIAGERR (YES in S1502), XLAMP (a lamp-illumination/nonillumination request flag) to turn off the lamp is set to "0" (S1503). When the counter DIAGERR is not equal to 0 (NO in S1501), and moreover when the count value of the counter DIAGOK is less than the count value of DIAGERR (NO in S1502), XLAMP is set to "1" (S1504).

It should be appreciated that the lamp is illuminated based on a comparison of the respective count values of the counters DIAGOK and DIAGERR, even when one abnormality occurs among a plurality of abnormality-detection targets, as such illumination is determined by a predetermined rule.

As was described earlier, the abnormality-detection detection objects 100 are increased or decreased according to changes in specifications (the number of abnormality-detection targets), but there is no need to alter the abnormality processing object 300, as it operates independent of the number of abnormality-detection target items that exist in the abnormality-detection objects 100. This is because if information had to be furnished to the abnormality processing object 300 to specify the abnormality-detection target, the abnormality processing object 300 would also have to be changed corresponding to the increase or decrease in the abnormality-detection object 100.

Consequently, according to the present invention, information indicating the group of the abnormality-detection target relating to a particular lamp is furnished to the abnormality-information table 116 of the abnormality-detection object 100, and the abnormality processing object 300 is structured to specify the abnormality-detection target relating to a particular lamp from this information. Accordingly, by comparing the number indicating present abnormalities (the number of DIAGERRs) and the number corresponding to recoveries to normality immediately from an abnormality determination, the abnormality processing object 300 can execute lamp-illumination processing independent of the total number of abnormality-detection targets relating thereto.

Also, in the present invention, the lamp-illumination flag is not immediately reset even when normal recovery has been performed, but is reset at the time at which the count processing has ended, as will be described later with (A)–(C) in FIG. 17. Owing thereto, the number of abnormality-detection targets that have recovered from abnormality to normality can be assessed. Additionally, maintained data may be anything until the count processing of DIAGOK has ended even when normal recovered has been performed.

FIG. 16 is a drawing indicating DIAGERR, DIAGOK, and the actual illumination/nonillumination state of a lamp when three sensors applying the same lamp have repeated normality and abnormality. This drawing shows a case of execution being repeated eight times in 65 ms intervals as described in FIG. 9. As indicated in the drawing, it is understood that lamp control can be appropriately performed by comparison of the number of diagnosis abnormalities (DIAGERR) and the number of diagnosis recoveries (DIAGOK).

As shown, (a) through (m) in the drawing are symbols added to supplement the description of the above-described described lamp-illumination/nonillumination timing. Namely, at (f) the number of diagnosis abnormalities should be the combination of (b) and (e) at this cycle (65 ms - 5), but instead has become "3." This is because at this timing, the "abnormality" of (a) is counted (because the lamp-illumination flag is still "1"). Additionally, the number of diagnosis recoveries "1" of (g) is the number of times (d) has been counted.

Additionally, with the cycle (65 ms - 8), the number of diagnosis abnormalities "1"of (l) is the number of times (h) has been counted, and the number of diagnosis recoveries "1" of (m) is the number of times (k) has been counted. When the number of diagnosis abnormalities and the number of diagnosis recoveries are equal, "nonillumination" is obtained.

Moreover, the "normal" states of (i) and (j) have not been counted, as is indicated by the "1" in (m). This is because a negative determination is made at FIG. 11, and processing (S1203) in FIG. 12 is not performed.

Figure 17:
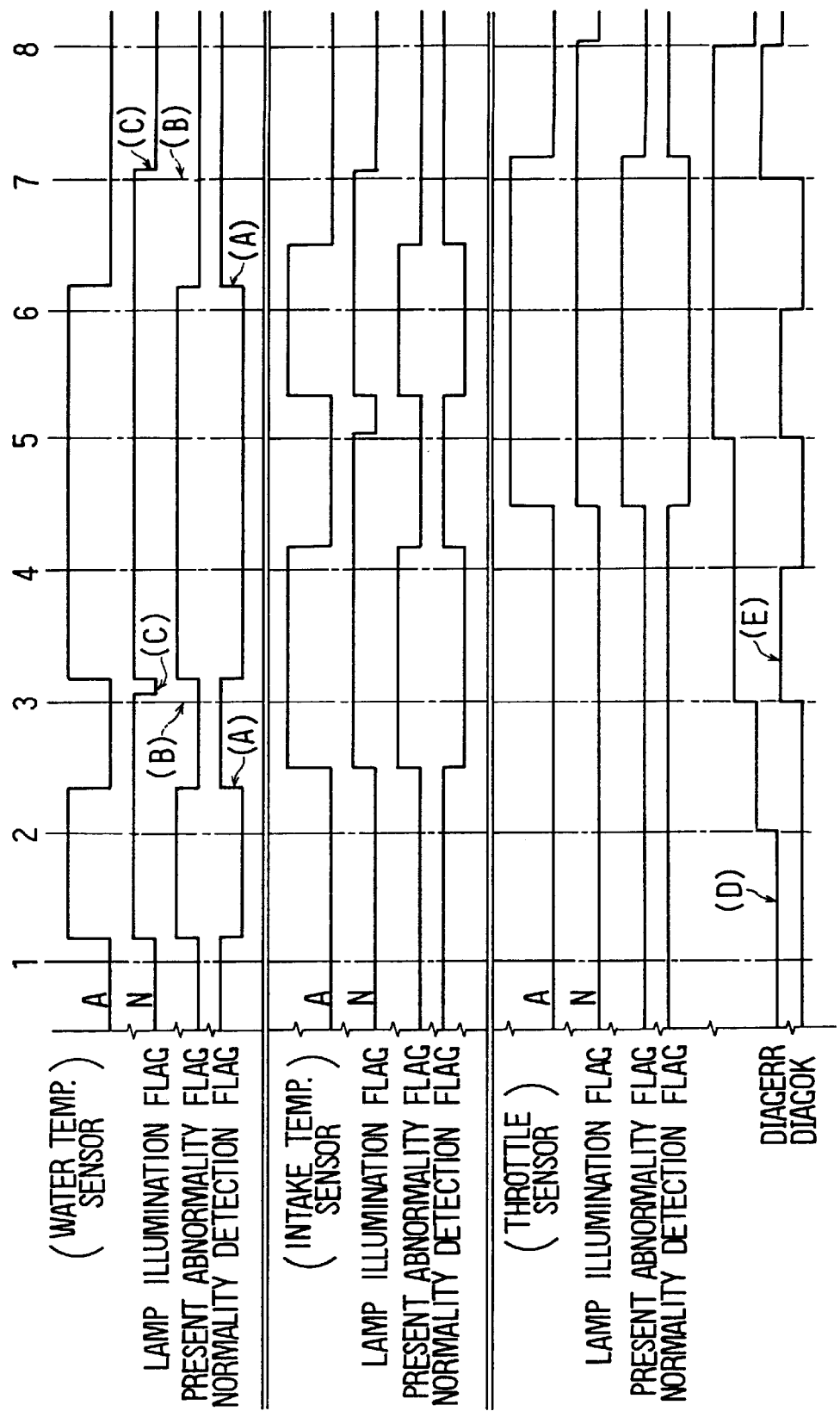
FIG. 17 is a timing diagram indicating the action of the respective flags and counters when normality/abnormality conditions in FIG. 16 have been repeated.
Figure 18:
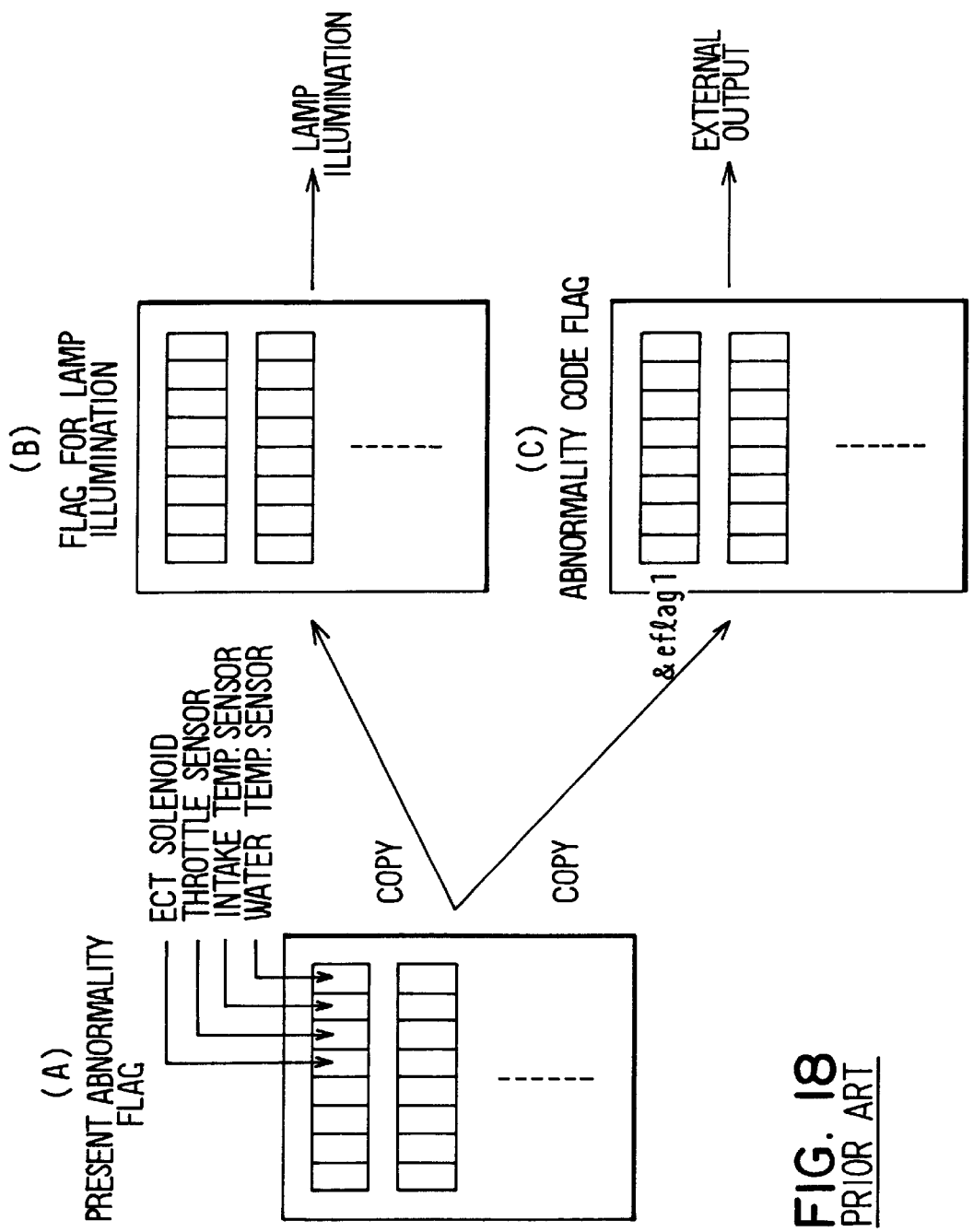
FIG. 18 is an explanatory diagram for a memory area for an abnormality flag, a flag for lamp-illuminating use, and an abnormality-code flag according to the prior art.

FIG. 17 is a timing diagram indicating the action of the respective flags and counters when normality/abnormality as in FIG. 16 has been repeated. A characteristic here is that the lamp-illumination flag is reset with count processing, without being immediately reset even when normal recovery has been performed. That is to say, as shown in (A), (B), and (C) in the drawing, even when normal recovery is performed at the timing of (A), the lamp-illumination flag is not reset at (C) until DIAGOK is counted at the timing of (B). As has been described above, the number of times that normality is determined upon recovery from an abnormality can be accurately counted. Further, (D) is the count of the number of lamp-illumination flags (number of abnormalities) due to DIAGERR, as is indicated at step S1202 in FIG. 12, and (E) is the number of times the lamp-illumination flag is "1" due to DIAGERR, as well as the number of times the normality-determination flag is "1," as is indicated at steps S1203 and S1204 in FIG. 12.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A vehicle controller diagnostic apparatus, comprising:
   a plurality of abnormality-detection objects each associated with a discrete detection target, each of said abnormality-detection objects having an abnormality-detection program and a first data-storing portion for storing data on the corresponding detection target during detection of a detection target abnormality and a second data-storing portion for storing data having abnormality occurrence processing information that indicates what is to be done when an abnormality occurrence is detected; and
   an abnormality processing object for performing abnormality-occurrence processing independently of the plurality of abnormality-detection objects but with respect to the corresponding detection targets based on data in the first data-storing portion that is revised based on data stored in said second data-storing portion of each of the abnormality-detection objects.

2. The diagnostic apparatus of claim 1, wherein said first data-storing portion is for storing a flag for each abnormality-detection target, and wherein said discrete abnormality-detection objects each further include a second data-storing portion table for storing information on the corresponding detection target.

3. The diagnostic apparatus of claim 1, further comprising an abnormality-verification object for determining, irrespective of the number of abnormality-detection objects, whether abnormality-detection results from each of said plurality of abnormality-detection objects are valid based on the data stored in said corresponding second data-storing portion.

4. A diagnostic apparatus for a vehicle controller, comprising:
   a plurality of discrete abnormality-detection objects each associated with a detection target, each of said plurality of discrete abnormality-detection objects having a program for detecting a specified vehicle abnormality, and a first storing portion for storing flags and a second data-storing portion for storing data showing what is to be done when an abnormality occurrence is detected; and
   an abnormality processing object for performing abnormality-occurrence processing independently of the plurality of abnormality-detection objects but with respect to corresponding detection targets based on said flags in the first storing portion;
   wherein each of said plurality of abnormality-detection objects sets a lamp-illumination flag to signal lamp illumination when the specified target abnormality is detected, and set a normality-determination flag when a target normality is detected; and
   said abnormality processing object includes a first counter for counting occurrences of the lamp-illumination flag and the normality-determination flag with respect to each of said plurality of abnormality-detection objects, and for counting a count number of lamp-illumination flag settings, a second counter for counting a count number of the normality-determination flag settings, said abnormality processing object for determining whether lamp illumination is to be performed by comparing the count number from said first counter and the count number from said second counter.

5. The diagnostic apparatus of claim 4, further comprising a resetting device for resetting said second counter until one of after determination of whether lamp illumination is to be performed by said abnormality processing object, and after count-processing by said first and second counter.

6. The diagnostic apparatus of claim 4, wherein count processing by said first and second counters is performed for each lamp to be illuminated, and each of said plurality of abnormality-detection objects is provided with data relating to illumination of each of said lamps.

7. A vehicle controller diagnostic apparatus, comprising:
   a plurality of abnormality-detection objects each associated with a detection target, each of said objects having an abnormality-detection program for detecting a target abnormality, and a first storing portion for storing a plurality of abnormality flags and a second data-storing portion for storing data showing what is to be done when an abnormality is detected; and
   an abnormality processing object for performing abnormality-occurrence processing independently of the plurality of abnormality-detection objects for indicating occurrence of said target abnormality based on said flags in said first storing portion of each said abnormality-detection objects;
   wherein said plurality of abnormality-detection objects set an abnormality-occurrence flag indicating said occurrence of said target abnormalities during abnormality detection in said first storing portion, and set a normality-determination flag indicating results of normality determinations in said first storing portion, said abnormality-occurrence flag and said normality-determination flag being revised by using data stored in said second data-storing portion; and
   said abnormality processing object including a first counter for investigating the abnormality-occurrence flag and the normality-determination flag with respect to a plurality of abnormality-detection objects and for counting a number of settings of the abnormality-occurrence flag, a second counter for counting a number of settings of both the abnormality-occurrence flag and the normality-determination flag, said abnormality processing object determining whether abnormality-indicating signals are to be generated for each of said abnormality targets by comparing count numbers from said first and second counters from each of said corresponding abnormality-detection objects.

8. The diagnostic apparatus of claim 7, wherein said abnormality processing object generates said abnormality-indicating signals for illuminating corresponding abnormality-indicating lamps based on a comparison of said corresponding first and second counters, and further comprising a delay device for delaying resetting of said abnormality processing object until after one of a determination by said abnormality processing object of whether to generate said abnormality-indicating signals, and after count-processing execution by said first and second counters in each of said plurality of abnormality-detection objects.

9. The diagnostic apparatus of claim 7, wherein count processing by said first and second counters is performed for abnormality-indicating signals to be generated, and said plurality of abnormality-detection objects are each provided with abnormality signal-related data.

10. The diagnostic apparatus of claim 7, further comprising an abnormality-verification object for determining, irrespective of a number of said plurality of abnormality-detection objects, whether abnormality-detection results from each of said plurality of abnormality-detection objects are valid based on the data stored in said data-storing portion.

11. An object-oriented based method of detecting an abnormality in a motor vehicle engine controller, comprising the steps of:

monitoring a number of abnormality targets to detect abnormality occurrences there at;

verifying at a single location, independent from the abnormality targets, the abnormality occurrences when the abnormality occurrences are detected at the abnormality targets;

processing at a single location, independent from the abnormality targets, abnormality-detection results generated during the steps of monitoring and verifying to determine whether abnormality-indicating signals should be generated; and wherein the step of verifying comprises:

determining if abnormality conditions at an abnormality target have been fulfilled based on information generated during the step of monitoring;

abnormality processing information indicating what should be done during an abnormality occurrence is stored in a second data-storing portion;

flags are stored in the first data-storing portion to execute the abnormality occurrence processing information;

wherein said processing step is performed by an abnormality processing object based on flags stored in said first data-storing portion; and wherein said steps of verifying and processing being performed independently of the number of abnormality targets being monitored.

12. The method of claim 11, further comprising:

providing abnormality indicating signal information during said step of monitoring; and generating abnormality-indicating signals, based on said abnormality-indicating information during said step of processing, in a manner independent of the number of abnormality targets being monitored.

13. The method of claim 11, further comprising:

modifying the number of abnormality targets monitored during the step of monitoring; and maintaining the steps of verifying and processing even after the step of modifying has been completed.

14. The method of claim 11, wherein the step of verifying comprises:

comparing the flags to a previously-generated flag to determine if a flag state has changed.

15. The method of claim 14, further comprising the step of copying the flags to an abnormality-code flag and to an abnormality signal flag when the flag state has changed.

16. The method of claim 14, further comprising the step of performing the step of verifying for each of said plurality of abnormality targets.

17. The method of claim 16, wherein said step of processing further comprises determining if the abnormality signals should be generated for any of said plurality of abnormality targets only after said step of performing is completed.

18. The method of claim 17, wherein said step of processing further comprises comparing a number of counted abnormalities to a number of counted recoveries from abnormalities during a predetermined time period to determine if the abnormality signals should be generated.

19. The diagnostic apparatus of claim 1, wherein said abnormality processing object is common to at least two of the abnormality-detection objects.

20. The diagnostic apparatus of claim 4, wherein said abnormality processing object is common to at least two of the abnormality-detection objects.

21. The diagnostic apparatus of claim 7, wherein said abnormality processing object is common to at least two of the abnormality-detection objects.

22. The method of claim 11 wherein said processing step is common to at least two abnormality targets.

* * * * *